United States Patent
Singh

(10) Patent No.: US 7,844,366 B2
(45) Date of Patent: *Nov. 30, 2010

(54) SYSTEM FOR MONITORING OPTIMAL EQUIPMENT OPERATING PARAMETERS

(75) Inventor: Abtar Singh, Kennesaw, GA (US)

(73) Assignee: Emerson Retail Services, Inc., Kennesaw, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/120,166

(22) Filed: May 2, 2005

(65) Prior Publication Data

US 2006/0020426 A1    Jan. 26, 2006

Related U.S. Application Data

(63) Continuation of application No. 10/286,419, filed on Oct. 31, 2002, now Pat. No. 6,889,173.

(51) Int. Cl.
G05B 21/00 (2006.01)

(52) U.S. Cl. .......... 700/276; 702/187; 705/412

(58) Field of Classification Search ......... 700/275–278, 700/299–301; 236/46 R, 91 D, 91 E, 91 F, 236/91 R; 702/188, 187; 165/201, 209; 705/412
See application file for complete search history.

(56) References Cited

U.S. PATENT DOCUMENTS

| | | | | |
|---|---|---|---|---|
| 4,205,381 A | * | 5/1980 | Games et al. ............... | 700/277 |
| 4,567,733 A | * | 2/1986 | Mecozzi ...................... | 62/175 |
| 4,703,325 A | * | 10/1987 | Chamberlin et al. ........ | 702/188 |
| 4,716,957 A | * | 1/1988 | Thompson et al. .......... | 165/209 |
| 4,924,404 A | | 5/1990 | Reinke, Jr. | |
| 5,395,042 A | * | 3/1995 | Riley et al. ................ | 236/46 R |
| 5,696,501 A | | 12/1997 | Ouellette et al. | |
| 5,745,114 A | | 4/1998 | King et al. | |
| 5,761,083 A | * | 6/1998 | Brown et al. ................ | 700/300 |
| 5,930,773 A | | 7/1999 | Crooks et al. | |
| 6,088,659 A | | 7/2000 | Kelley et al. | |
| 6,088,688 A | | 7/2000 | Crooks et al. | |
| 6,122,603 A | | 9/2000 | Budike, Jr. | |
| 6,169,979 B1 | | 1/2001 | Johnson | |
| 6,327,541 B1 | | 12/2001 | Pitchford et al. | |
| 6,334,093 B1 | * | 12/2001 | More .......................... | 702/99 |
| 6,366,889 B1 | * | 4/2002 | Zaloom ...................... | 705/412 |
| 6,510,350 B1 | | 1/2003 | Steen, III et al. | |

(Continued)

OTHER PUBLICATIONS

UltraSite User's Guide, Computer Process Controls, Apr. 1, 1996.

(Continued)

*Primary Examiner*—Charles R Kasenge
(74) *Attorney, Agent, or Firm*—Harness, Dickey & Pierce, P.L.C.

(57) ABSTRACT

A set-point monitoring system includes a controller for at least one piece of equipment operating at a set point and a monitor that communicates with the controller. At least one of the monitor and the controller receives a present value of the set point and compares the present value to a previous value or to a benchmark value. The monitor records the present value when the present value is different than the previous value. The monitor also determines a monetary cost based on the difference between the present value and the previous value or the difference between the present value and the benchmark value.

34 Claims, 5 Drawing Sheets

U.S. PATENT DOCUMENTS

| | | | |
|---|---|---|---|
| 6,535,859 B1 * | 3/2003 | Yablonowski et al. | 705/412 |
| 6,577,962 B1 | 6/2003 | Afshari | |
| 6,583,720 B1 | 6/2003 | Quigley | |
| 6,591,620 B2 * | 7/2003 | Kikuchi et al. | 700/276 |
| 6,618,709 B1 | 9/2003 | Sneeringer | |
| 6,622,925 B2 | 9/2003 | Carner et al. | |
| 6,816,811 B2 | 11/2004 | Seem | |
| 6,889,173 B2 * | 5/2005 | Singh | 702/188 |
| 6,900,738 B2 | 5/2005 | Crichlow | |
| 6,904,385 B1 | 6/2005 | Budike, Jr. | |
| 6,968,295 B1 | 11/2005 | Carr | |
| 6,978,225 B2 | 12/2005 | Retlich et al. | |
| 7,039,532 B2 | 5/2006 | Hunter | |
| 7,043,459 B2 * | 5/2006 | Peevey | 705/412 |
| 7,130,832 B2 * | 10/2006 | Bannai et al. | 705/412 |
| 7,246,014 B2 | 7/2007 | Forth et al. | |
| 2002/0143482 A1 | 10/2002 | Karanam et al. | |
| 2002/0198629 A1 | 12/2002 | Ellis | |
| 2003/0213851 A1 * | 11/2003 | Burd et al. | 236/44 A |

OTHER PUBLICATIONS

UltraSite User's Guide RMCC Supplement, Computer Process Controls, Jun. 9, 1997.
UltraSite User's Guide BCU Supplement, Computer Process Controls, Sep. 4, 1997.
UltraSite User's Guide BEC Supplement, Computer Process Controls, Oct. 6, 1997.
UltraSite 32 User's Guide, Computer Process Controls, Sep. 28, 1999.

\* cited by examiner

SYSTEM FOR MONITORING OPTIMAL EQUIPMENT OPERATING PARAMETERS

CROSS-REFERENCE TO RELATED APPLICATIONS

This application is a continuation of U.S. patent application Ser. No. 10/286,419 filed on Oct. 31, 2002. The disclosure of the above application is incorporated herein by reference.

FIELD OF THE INVENTION

The present invention relates to monitoring equipment operating parameters and, more particularly, to a system for monitoring optimal equipment parameters of equipment for refrigeration, HVAC, lighting, anti-condensate heating, and other systems.

BACKGROUND OF THE INVENTION

Retail outlets, particularly food retailers, require a plurality of systems during operation. Such systems often include refrigeration, HVAC, lighting, anti-condensate heating (ACH), and defrost control systems. Each of these systems include associated equipment to perform various functions. For example, refrigeration systems include compressors, condensers, evaporators, and the like to cool refrigeration cases to a desired temperature.

The various types of equipment include operating parameters, or set points, at which the equipment operates. The set point defines the operating condition of the equipment and is adjusted to provide a desired output from the equipment. For example, a set point of an electronic pressure regulator is adjusted to maintain a desired pressure within an evaporator of a refrigeration system. Because the equipment of the various systems consume power during their operation, the amount of power consumed by a particular piece of equipment corresponds to the set point value. Thus, if a set point is changed, the amount of power consumed by the equipment correspondingly changes.

Generally, a retailer configures the particular systems of its associated retail locations to operate at an optimized level. Thus, optimized set points are determined and set, whereby the systems operate in a desired manner, typically efficiently. However, set point changes can occur for various reasons, including maintenance, cleaning, and the like. Often, the set points are not returned to their previous levels, resulting in the systems operating in an undesired manner or at inefficient levels. Traditionally, it is difficult for a retailer to routinely monitor the set points of the systems of its various retail locations. As a result, the systems of the retail locations operating in an undesired manner or at inefficient levels incur significant cost to the retailer over time.

SUMMARY OF THE INVENTION

The present invention provides a method of monitoring optimal equipment operating parameters of a remote system. The method includes monitoring an operating parameter of a piece of equipment of the remote system and communicating the operating parameter to a monitoring system. A present value of the operating parameter is compared to a previous value, and a change is indicated if the present value is different than the previous value.

Preferably, a difference between the present value and the previous value is determined. The difference is associated with a monetary value to indicate one of an increase and a decrease in cost. Additionally, the monitoring system is accessible by a remote user via a communication network, whereby the remote user is able to review changes and associated costs of the operating parameter.

Further areas of applicability of the present invention will become apparent from the detailed description provided hereinafter. It should be understood that the detailed description and specific examples, while indicating the preferred embodiment of the invention, are intended for purposes of illustration only and are not intended to limited the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
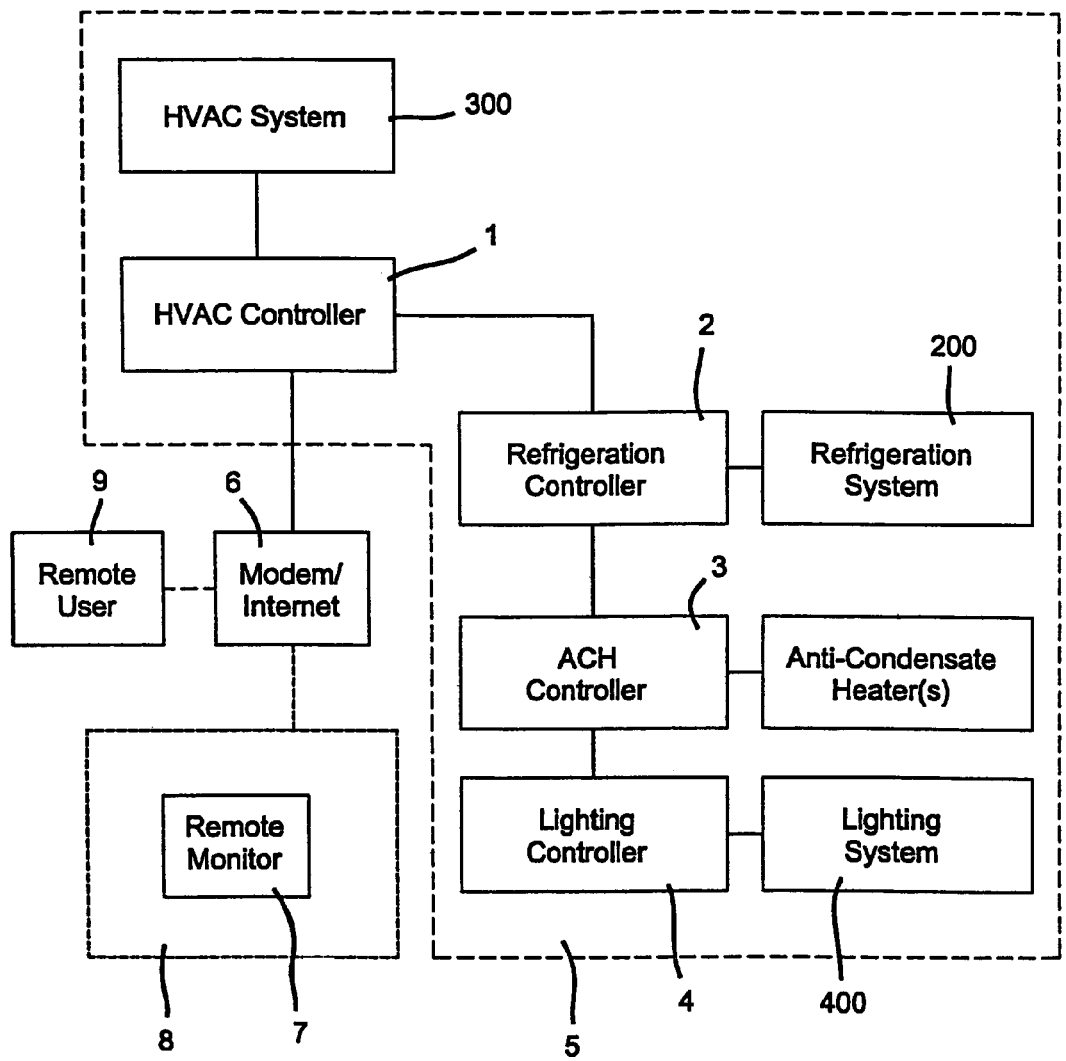
FIG. 1 is a schematic illustration of a building system for use with the method for analyzing the building system performance according to the principles of the present invention.

The present system for monitoring optimal equipment operating parameters provides a comprehensive building system assessment and energy management solution. The system is particularly applicable to refrigeration, HVAC, lighting, anti-condensate heating (ACH), and defrost control systems. As shown in FIG. 1, an HVAC controller 1 is in communication with a refrigeration controller 2, an ACH condensate heater controller 3, and a lighting controller 4. These components are typically located in a building 5. Further, the HVAC controller 1 is in communication via communication network 6, including a modem or internet connection, to a remote monitor 7 at a remote location 8. As shown, the HVAC controller 1 communicates with the HVAC system, with the refrigeration controller 2, the ACH controller 3, and the lighting controller 4, which respectively communicate with the refrigeration system, the anti-condensate heaters, and lighting system. Although the HVAC controller 1 is shown as a communication gateway between the various controllers 2, 3, 4 and the remote monitor 7, it will be appreciated that any of the controllers 1-4 can function as a communication gateway. Alternatively, each controller 1, 2, 3, 4 can be connected to a network backbone that has a dedicated communication gateway (such as a personal computer, server computer or other controller) to provide internet, modem or other remote access. It will be appreciated that the illustration of FIG. 1 is merely exemplary, and more or fewer building control systems may be included.

Figure 2:
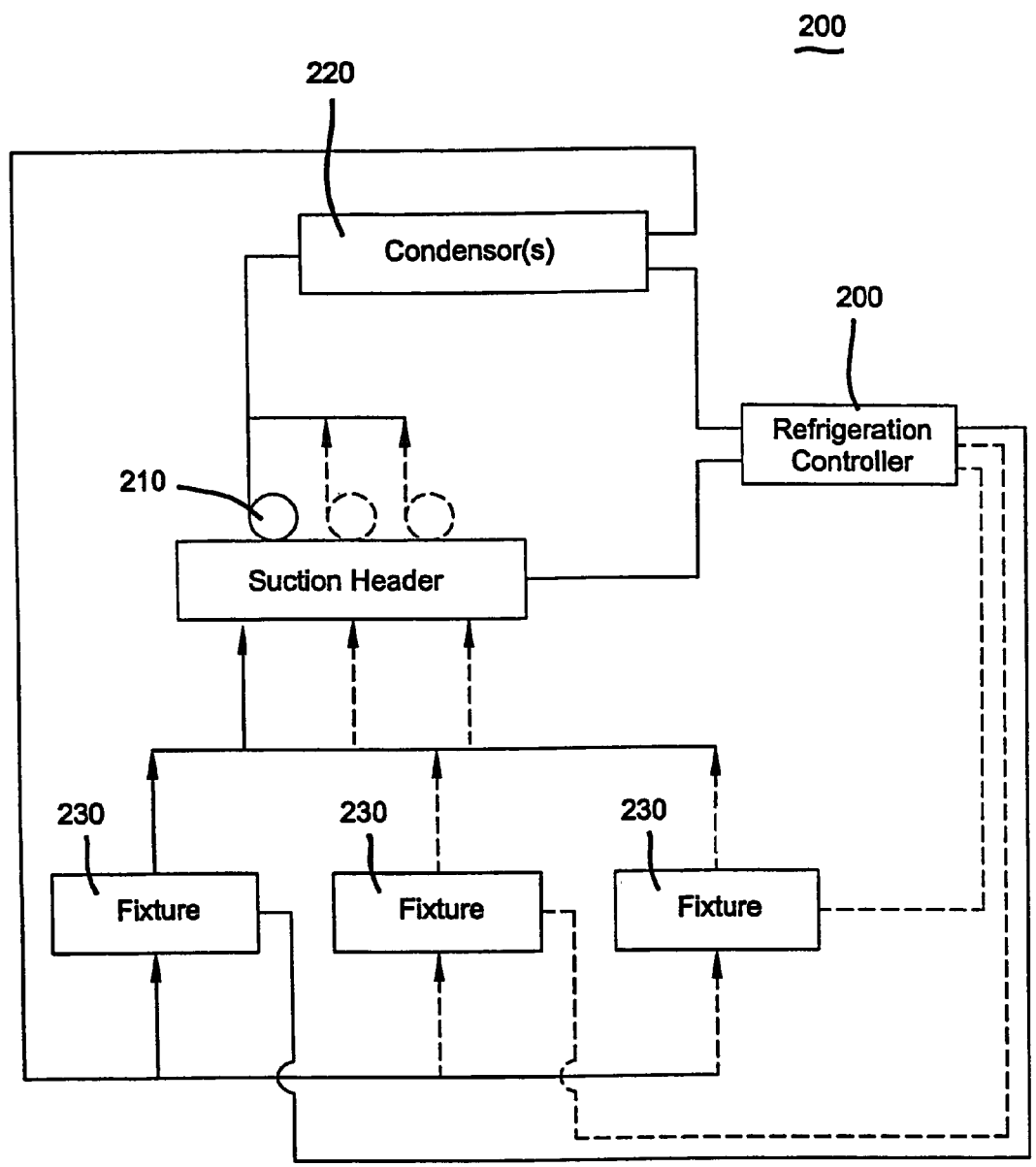
FIG. 2 is a schematic illustration of an exemplary refrigeration system according to the principles of the present invention.

With reference to FIG. 2, a basic refrigeration system 200 is shown. The refrigeration system 200 includes one or more compressors 210, condensers 220 and refrigeration fixtures 230. The condensers 220, compressors 210, and refrigeration fixtures 230 communicate with the refrigeration controller 2. Such communication may be networked, dedicated direct connections or wireless.

Figure 3:
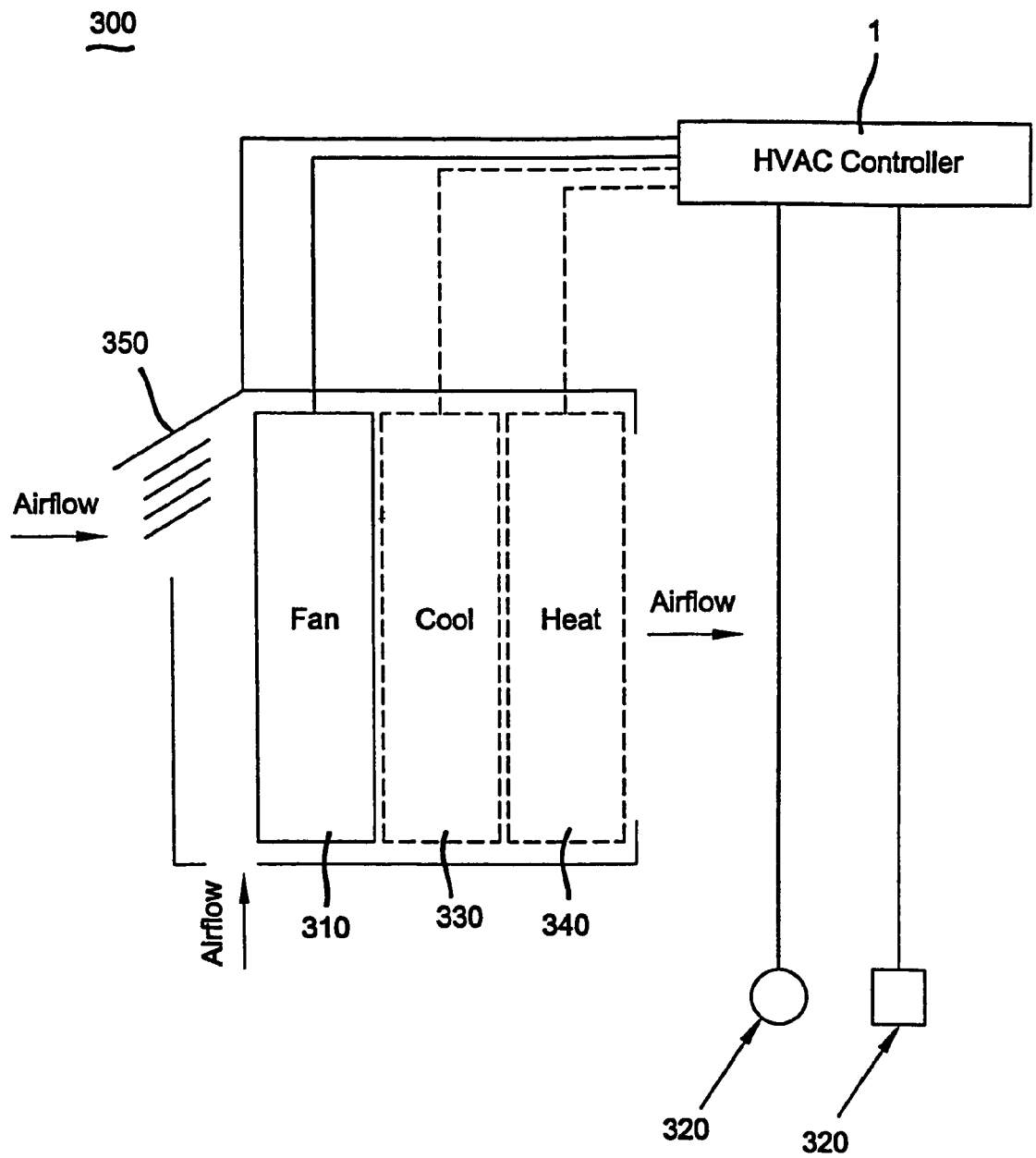
FIG. 3 is a schematic illustration of an exemplary HVAC system according to the principles of the present invention.

Similarly with FIG. 3, an exemplary HVAC system 300 is shown. As shown, the HVAC controller 1 communicates with a fan 310 and sensors 320, as well as a cooling apparatus 330, heating apparatus 340 and damper 350, if appropriate. The fan 310, cooling apparatus 330, heating apparatus 340 and damper 350 communicate with the HVAC controller 1. Such communication may be networked, dedicated direct connections or wireless.

Figure 4:
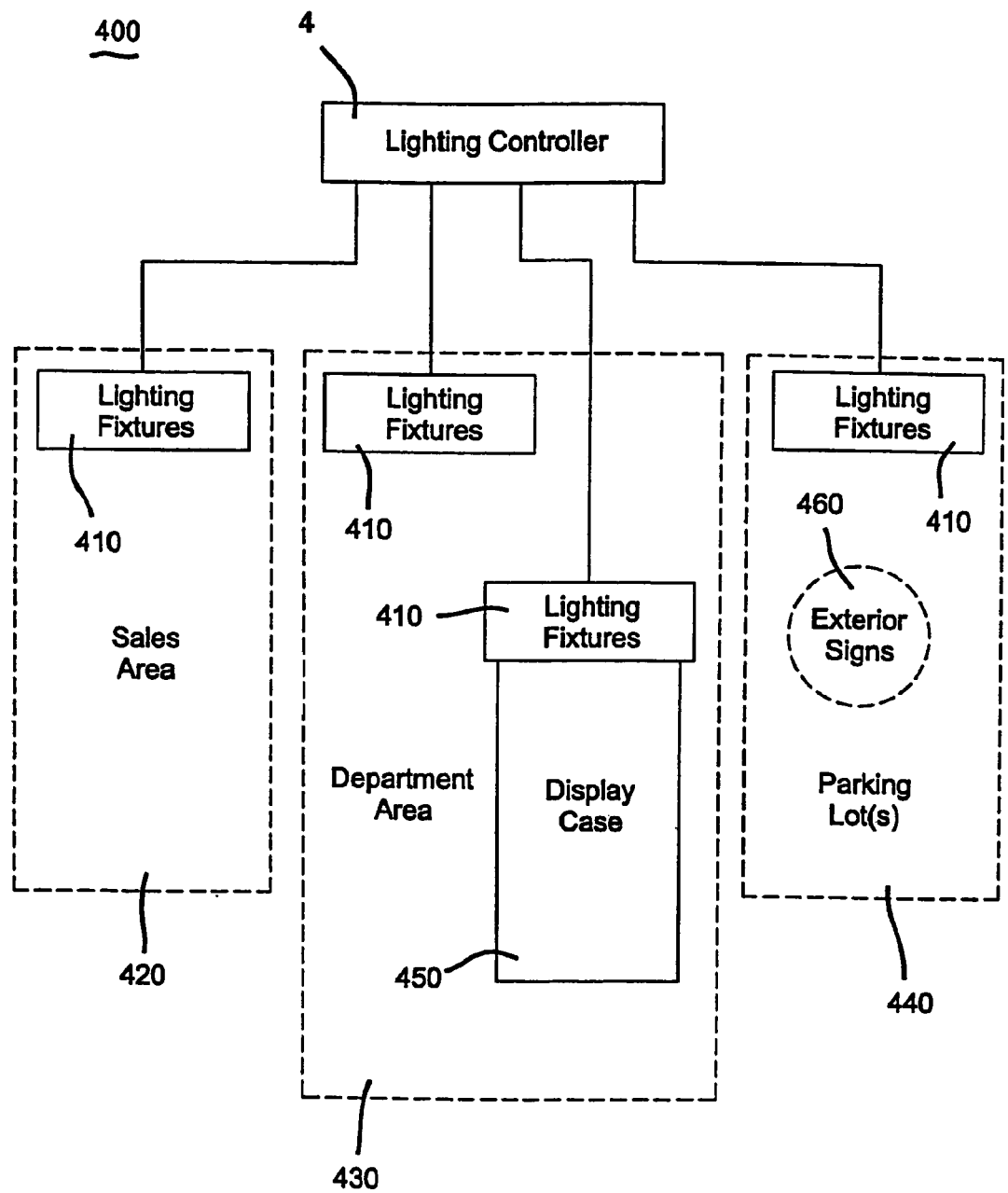
FIG. 4 is a schematic illustration of an exemplary lighting system according to the principles of the present invention.

FIG. 4 shows a lighting system 400. As shown, one or more lighting fixtures 410 communicate with the lighting controller 4. The lighting fixtures 410 are shown in various areas of the building and its exterior, with some areas including multiple types of fixtures while lighting fixtures for multiple areas may also be similarly controlled. For example, FIG. 4 illustrates a sales area 420, a department area 430 and a parking lot 440. The department area 430 includes lighting fixtures 410, as well as lighting fixtures 410 for display cases 450 therein. The parking lot 440 includes lighting fixtures 410 as well as an exterior sign lighting 460. The various lighting fixtures 410 are in communication with the lighting controller 4. Such communication may be networked, dedicated direct connections or wireless.

Figure 5:
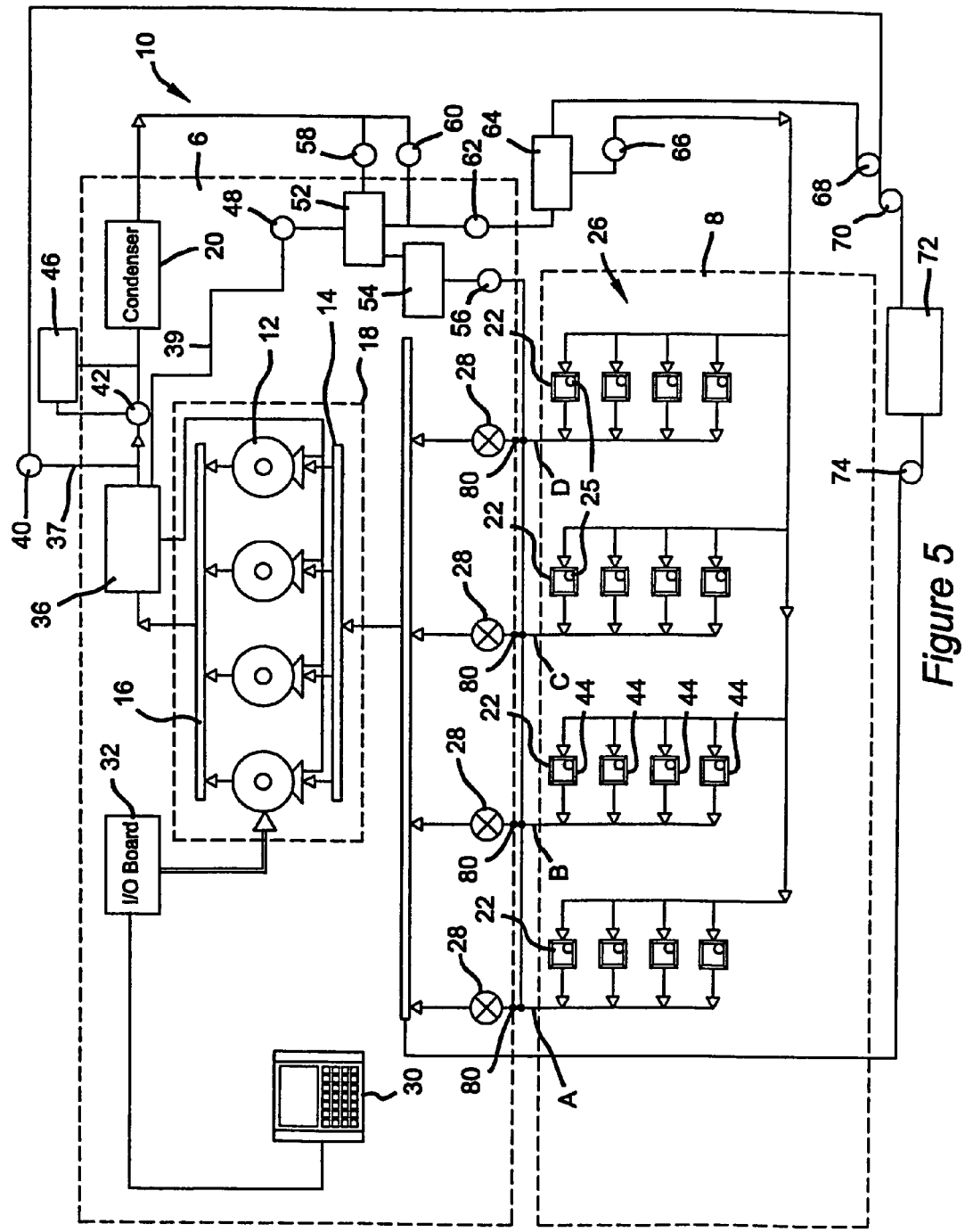
FIG. 5 is a detailed schematic illustration of an exemplary refrigeration system according to the principles of the present invention.

With reference to FIG. 5, a detailed block diagram of the exemplary refrigeration system 200 is shown. The refrigeration system 200 includes a plurality of compressors 12 piped together with a common suction header 14 and a discharge header 16 all positioned within a compressor rack 18. The compressor rack 18 compresses refrigerant vapor that is delivered to an oil separator 36 from which the vapor is delivered via a first line 37 to a hot gas defrost valve 40 and a three-way heat reclaim valve 42. The hot gas defrost valve 40 enables hot gas to flow to an evaporator (not shown) through liquid line solenoid valve 70 and solenoid valve 68. The heat reclaim valve 42 enables hot gas to flow to the heat reclaim coils 46 and to a condenser 20 where the refrigerant vapor is liquefied at high pressure.

A second line 39 of the oil separator 36 delivers gas through a receiver pressure valve 48 to a receiver 52. The receiver pressure valve 48 ensures the receiver pressure does not drop below a set value. The condenser 20 sends fluid through a condenser flood back valve 58 to the receiver 52. The condenser flood back valve 58 restricts the flow of liquid to the receiver 52 if the condenser pressure becomes too low. Evaporator pressure regulator (EPR) valves 28 are mechanical control valves used to maintain a minimum evaporator pressure in cases 22. The EPR valves 28 operate by restricting or opening a control orifice to raise or lower the pressure drop across the valve, thereby maintaining a steady valve inlet (and associated evaporator pressure) even as the evaporator load or rack suction pressure varies in response to the addition or subtraction of compressor capacity or other factors.

A surge valve 60 enables liquid to bypass the receiver 52 when it is subcooled in the ambient. Accordingly, ambient subcooled liquid joins liquid released from the receiver 52, and is then delivered to a differential pressure regulator valve 62. During defrost, the differential pressure regulator valve 62 reduces pressure delivered to the liquid header 64. This reduced pressure enables reverse flow through the evaporator during defrost. Liquid flows from liquid header 64 via a first line through a liquid branch solenoid valve 66, which restricts refrigerant to the evaporators during defrost but enables back flow to the liquid header 64. A second line carries liquid from the liquid header 64 to the hot gas defroster 72 where it exits to an EPR/Sorit valve 74. The EPR/Sorit valve 74 adjusts so the pressure in the evaporator is greater than the suction header 14 to enable the evaporator to operate at a higher pressure.

The high-pressure liquid refrigerant leaving liquid branch solenoid valve 66 is delivered to a plurality of refrigeration cases 22 by way of piping 24. Circuits 26 consisting of a plurality of refrigeration cases 22 operate within a certain temperature range. FIG. 5 illustrates four (4) circuits 26 labeled circuit A, circuit B, circuit C and circuit D. Each circuit 26 is shown consisting of four (4) refrigeration cases 22. However, those skilled in the art will recognize that any number of circuits 26, as well as any number of refrigeration cases 22 may be employed within a circuit 26. As indicated, each circuit 26 will generally operate within a certain temperature range. For example, circuit A may be for frozen food, circuit B may be for dairy, circuit C may be for meat, etc.

Because the temperature requirement is different for each circuit 26, each circuit 26 includes a EPR valve 28 that acts to control the evaporator pressure and, hence, the temperature of the refrigerated space in the refrigeration cases 22. The EPR valves 28 can be electronically or mechanically controlled. Each refrigeration case 22 also includes its own expansion valve (not shown) that may be either a mechanical or an electronic valve for controlling the superheat of the refrigerant. In this regard, refrigerant is delivered by piping to the evaporator in each refrigeration case 22. The refrigerant passes through an expansion valve where a pressure drop causes the high pressure liquid refrigerant to become a lower pressure combination of liquid and vapor. As the hot air from the refrigeration case 22 moves across the evaporator, the low pressure liquid turns into gas. This low pressure gas is delivered to the pressure regulator 28 associated with that particular circuit 26. At EPR valves 28, the pressure is dropped as the gas returns to the compressor rack 18. At the compressor rack 18, the low pressure gas is again compressed to a high pressure gas, which is delivered to the condenser 20, which creates a high pressure liquid to supply to the expansion valve and start the refrigeration cycle over.

A main refrigeration controller 2 is used and configured or programmed to control the operation of the refrigeration system 200. The refrigeration controller 2 is preferably an Einstein Area Controller offered by CPC, Inc. of Atlanta, Ga., U.S.A., or any other type of programmable controller which may be programmed, as discussed herein. The refrigeration controller 2 controls the bank of compressors 12 in the compressor rack 18 via an input/output module 32. The input/output module 32 has relay switches to turn the compressors 12 on and off to provide the desired suction pressure. A separate case controller (not shown), such as a CC-100 case controller, also offered by CPC, Inc. of Atlanta, Ga., U.S.A., may be used to control the superheat of the refrigerant to each refrigeration case 22 via an electronic expansion valve in each refrigeration case 22 by way of a communication network or bus 34. Alternatively, a mechanical expansion valve may be used in place of the separate case controller. Should separate case controllers be utilized, the main refrigeration controller 2 may be used to configure each separate case controller, also via the communication bus 34. The communication bus 34 may be a RS-485 communication bus, a LonWorks Echelon bus or any other communication platform that enables the main refrigeration controller 30 and the separate case controllers to receive information from each case 22.

Each refrigeration case may have a temperature sensor 44 associated therewith, as shown for circuit B. The temperature sensor 44 can be electronically or wirelessly connected to the controller 2 or the expansion valve for the refrigeration case. Each refrigeration case 22 in the circuit B may have a separate temperature sensor 44 to take average/minimum/maximum temperatures or a single temperature sensor 44 in one refrigeration case 22 within circuit B may be used to control each case 22 in circuit B because all of the refrigeration cases 22 in a given circuit operate in substantially the same temperature range. These temperature inputs are preferably provided to the analog input board 38, which returns the information to the main refrigeration controller via the communication bus 34.

The particular set points of the various equipment of the refrigeration system 200 are preferably set to optimized values to achieve efficient operation of the refrigeration system 200. These optimized values are benchmark values preferably determined during a system performance analysis. Such a method is disclosed in commonly assigned U.S. patent application No. 60/287,458, entitled Building System Performance Analysis, which is expressly incorporated herein by reference. In short, the method includes an examination of existing system conditions and operating parameters using a combination of remote monitoring and on-site technicians. A series of prescribed testing and adjustment procedures are also conducted. Through a continuous follow-up process and associated feedback-loop activities, optimized operating parameters (i.e., set points) of the various equipment are determined to maintain the system in an enhanced performance state. Although the optimized operating parameters of the refrigeration system 200 are preferably determined implementing the method described immediately above, it will be appreciated that other methods may be used.

While the present invention is discussed in detail below with respect to specific components as contained in refrigeration system 200, it will be appreciated that the present invention may be employed with other types of systems having configurable components to provide substantially the same results as discussed herein. By way of example, other types of systems include, but are not limited to HVAC, lighting, ACH, and defrost.

Initially, application-specific operating parameters, or set points, are determined for the equipment of the refrigeration system 200. These set points include control method (e.g., pressure, temperature), suction float, minimum float point, maximum float point, suction group set point, control sensor offset, condenser set point, and ambient sensor offset. More particularly, the set points preferably include minimum head pressure, air-cooled condenser fan speed, hold-back valve pressure, evaporator condenser sump temperature, receiver pressurization valve, EPR valve pressure, suction pressure, and discharge pressure. As discussed above, these set points are preferably determined implementing the system performance analysis method.

With regard to the HVAC systems 300, set points include cooling, heating, dehumidification, cooling override, heating override and fan override. With regard to defrost, set points include number of defrosts per day, defrost duration, termination type and termination temperature. For the lighting system 400, set points include light level, on time and off time.

The monitoring method of the present invention initially includes each controller 1, 2, 3, 4 monitoring the equipment set points of their respective systems. It is anticipated that the controllers 1, 2, 3, 4 either continuously monitor the set points, periodically monitor the set points, or are alerted to a set point change. Continuous, and alert monitoring of the set points enable the particular controller to determine the precise time a set point change occurred. Periodically monitoring the set points enables the particular controller to determine a time range, within which a set point change occurred. The remote monitor 7 periodically communicates with the controllers 1, 2, 3, 4 through the communication network 6 to obtain the various set point information.

The remote monitor 7 stores the set point information in memory for the various systems of building 5. The remote monitor 7 periodically communicates with the controllers 1, 2, 3, 4 to obtain present set point information. The remote monitor 7 also records the base or benchmark set points for the equipment of the various systems. In this manner, the benchmark set point is stored for informational purposes. The remote monitor 7 initially records the benchmark set point as a prior set point. The remote monitor 7 compares the monitored, or present set point to the prior set point for the individual equipment. In this manner, the remote monitor 7 determines whether a change in any of the set points has occurred. If there is no difference between the present set point and the prior set point, then the remote monitor 7 continues monitoring with no other action. If there is a difference between the present set point and the prior set point, the remote monitor 7 stores into memory the present set point as well as the time that the set point change occurred.

Once the set point information has been recorded into memory, the remote monitor 7 overwrites the prior set point, recording the present set point as the prior set point. In this manner, the prior set point is consistently updated after a change in set point occurs and continues to be the value compared against to determine whether further changes in set point have occurred.

It is also anticipated that the controllers 1, 2, 3, 4 can continuously monitor the set point changes in their respective systems and alert the remote monitor of a change in set point. More specifically, the local controllers 1, 2, 3, 4 store the benchmark set point. The controllers initially record the benchmark set point as the prior set point. The controllers compare the monitored, or present set point to the prior set point for the individual equipment. In this manner, the controllers determine whether a change in any of the set points has occurred. If there is no difference between the present set point and the prior set point, then the controllers continue monitoring with no other action. If there is a difference between the present set point and the prior set point, the controllers store into memory the present set point as well as the time that the set point change occurred.

Once the set point information has been recorded into memory, the controllers overwrite the prior set point, recording the present set point as the prior set point. In this manner, the prior set point is consistently updated after a change in set point occurs and continues to be the value compared against to determine whether further changes in set point have occurred.

Regardless of whether the local controllers 1, 2, 3, 4 or the remote monitor 7 monitor the set point changes, the remote monitor 7 inputs the set point information into a database. The database is accessible via the communication network 6 by a remote user 9. The database sorts the set point information such that it is accessible by the remote user 9 in a variety of manners via a web interface. For example, the remote user 9 may select a particular location (e.g., building 5) to view the set point changes, and present set point values at that particular location. Additionally, the remote user 9 is able to view the benchmark set points of the various equipment within a particular location, the present set point, and the set point used prior to the benchmark set point. Further, the remote user 9 can access a summary of the set point changes which have occurred across all of the locations. The various set point information is accessible for any of the systems, including the refrigeration system 200, ACH, defrost, HVAC 300, and lighting 400 systems.

The remote monitor 7 further associates the set points and set point changes with a cost. The set points of the various equipment within the systems signal the equipment to operate consuming an associated amount of power. A set point change alters the amount of power required by a piece of equipment to operate. Thus, a comparison of set points can indicate an increase, or decrease in power consumption. Standardized costs are available throughout different regions to determine a cost associated with a particular power consumption rate. More particularly, the remote monitor 7 is able to access a database that maintains a record of power consumption costs for various regions, or even particular locations. The remote monitor 7 is able to determine a rate of power consumption for a particular piece of equipment at the benchmark set point, and compare that to a rate of power consumption at the present set point. If there is a difference between the two, the remote monitor is able to associate this difference with a cost. In this manner, the remote user 9 may determine the effect a set point change has on the overall operating costs of the particular system for a chosen time period (e.g., days, weeks, years, etc.).

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A set-point monitoring system for a controller associated with at least one piece of equipment operating according to an associated set-point being set and adjustable for said at least one piece of equipment, said monitoring system comprising a monitor in communication with said controller and at least one of said monitor and said controller receiving a present value of said associated set-point and comparing said present value to a previous value of said associated set-point and said monitor recording said present value if said present value is different than said previous value and calculating a power consumption difference based on said present value and said previous value, wherein said associated set-point is selected from the group comprising: a pressure, a temperature, a suction float point, a minimum float point, a maximum float point, a suction group pressure, a control sensor offset, an ambient sensor offset, a minimum head pressure, an air-cooled condenser fan speed, a hold-back valve pressure, an evaporator condenser sump temperature, a pressure from a receiver pressurization valve, a pressure from an EPR valve, a suction pressure, a discharge pressure, a cooling value, a heating value, a dehumidification value, a cooling override, a heating override, and a fan override.

2. The set-point monitoring system of claim 1 wherein said controller receives said present value, compares said present value to said previous value and notifies said monitor when said present value is different than said previous value.

3. The set-point monitoring system of claim 1 wherein said monitor maintains a database of set-point information comprising present values of set-points for multiple pieces of equipment.

4. The set-point monitoring system of claim 3 wherein said database of set-point information is accessible to a communication network.

5. The set-point monitoring system of claim 1 wherein said monitor determines a monetary cost based on said power consumption difference.

6. The set-point monitoring system of claim 5 wherein said monitor determines said monetary cost based on said power consumption difference and a predetermined power consumption cost rate.

7. The set-point monitoring system of claim 5 further comprising a database of power consumption cost rates accessible to said monitor wherein said monitor retrieves a power consumption cost rate from said database and determines said monetary cost based on said power consumption difference and said power consumption cost rate.

8. The set-point monitoring system of claim 1 wherein said associated set-point includes at least one of a temperature or pressure value and said at least one piece of equipment is selected from the group comprising:
an evaporator, a condenser, a compressor, a condenser fan, an EPR valve, and a receiver.

9. The set-point monitoring system of claim 1 wherein said at least one piece of equipment is associated with an HVAC system.

10. The set-point monitoring system of claim 1 wherein said controller receives said present value of said associated set-point, compares said present value to a benchmark set-point and records said present value when said present value is different than said benchmark value.

11. The set-point monitoring system of claim 1 wherein said controller receives said present value of said associated set-point and determines a power consumption difference based on a benchmark set-point and said present value.

12. The set-point monitoring system of claim 11 wherein said controller calculates a monetary cost based on said power consumption difference.

13. The set-point monitoring system of claim 1 wherein said associated set-point is said temperature.

14. The set-point monitoring system of claim 1 wherein said associated set-point is said suction group pressure.

15. A set-point monitoring system for a controller associated with at least one piece of equipment operating at an associated set-point being set and adjustable for said at least one piece of equipment, said monitoring system comprising a monitor in communication with said controller, said monitor receiving a present value of said associated set-point, comparing said present value of said associated set-point to a benchmark set-point, determining a power consumption difference based on said benchmark set-point and said present value, calculating a monetary cost based on said power consumption difference, and maintaining a database that stores set point information that includes the benchmark set point, the present value of the associated set point, and previous values of the associated set-point, wherein said associated set-point is selected from the group comprising: a pressure, a temperature, a suction float point, a minimum float point, a maximum float point, a suction group pressure, a control sensor offset, an ambient sensor offset, a minimum head pressure, an air-cooled condenser fan speed, a hold-back valve pressure, an evaporator condenser sump temperature, a pressure from a receiver pressurization valve, a pressure from an EPR valve, a suction pressure, and a discharge pressure, a cooling value, a heating value, a dehumidification value, a cooling override, a heating override, and a fan override.

16. The set-point monitoring system of claim 15 wherein said monitor determines said monetary cost based on said power consumption difference and a predetermined power consumption cost rate.

17. The set-point monitoring system of claim 15 wherein said associated set-point includes at least one of a temperature or pressure value and said at least one piece of equipment is selected from the group comprising:

an evaporator, a condenser, a compressor, a condenser fan, an EPR valve, and a receiver.

18. The set-point monitoring system of claim 15 wherein said associated set-point is said temperature.

19. The set-point monitoring system of claim 15 wherein said associated set-point is said suction group pressure.

20. A method comprising:
monitoring a set-point associated with at least one piece of equipment, said set-point being set and adjustable for said at least one piece of equipment;
comparing a present value of said set-point and a previous value of said set-point;
recording said present value if said present value is different than said previous value;
determining a power consumption cost rate for said at least one piece of equipment;
determining a power consumption difference based on said present value and said previous value; and
calculating a monetary cost based on said power consumption cost rate and said power consumption difference;
wherein said set-point is selected from the group comprising: a pressure, a temperature, a suction float point, a minimum float point, a maximum float point, a suction group pressure, a control sensor offset, an ambient sensor offset, a minimum head pressure, an air-cooled condenser fan speed, a hold-back valve pressure, an evaporator condenser sump temperature, a pressure from a receiver pressurization valve, a pressure from an EPR valve, a suction pressure, and a discharge pressure, a cooling value, a heating value, a dehumidification value, a cooling override, a heating override, and a fan override.

21. The method of claim 20 wherein said previous value is a benchmark set-point.

22. The method of claim 20 wherein said determining a power consumption cost rate comprises accessing a database of power consumption cost rates.

23. The method of claim 22 wherein said database of power consumption cost rates is accessed based on a location of said at least one piece of equipment.

24. The method of claim 20 wherein said set-point includes at least one of a temperature or pressure value and said at least one piece of equipment is selected from the group comprising:
an evaporator, a condenser, a compressor, a condenser fan, an EPR valve, and a receiver.

25. The method of claim 20 wherein said set-point is said temperature.

26. The method of claim 20 wherein said set-point is said suction group pressure.

27. A set-point monitoring system for a controller associated with at least one piece of equipment operating at an associated set-point being set and adjustable for said at least one piece of equipment, said monitoring system comprising a monitor communicating with said controller and storing a present value of said associated set-point, said controller receiving a user-inputted value of said associated set-point, comparing said user-inputted value to said present value, and notifying said monitor when said user-inputted value is different than said present value, and said monitor updating said present value to said user-inputted value if notified by said controller and calculating a power consumption difference based on said user-inputted value and said previous value, and a database storing set point information that includes the present value of the associated set point and previous values of the associated set point,
wherein said associated set-point is selected from the group comprising: a pressure, a temperature, a suction float point, a minimum float point, a maximum float point, a suction group pressure, a control sensor offset, an ambient sensor offset, a minimum head pressure, an air-cooled condenser fan speed, a hold-back valve pressure, an evaporator condenser sump temperature, a pressure from a receiver pressurization valve, a pressure from an EPR valve, a suction pressure, and a discharge pressure, a cooling value, a heating value, a dehumidification value, a cooling override, a heating override, and a fan override.

28. The set-point monitoring system of claim 27 wherein said monitor determines a monetary cost based on said power consumption difference.

29. The set-point monitoring system of claim 28 wherein said monitor determines said monetary cost based on said power consumption difference and a predetermined power consumption cost rate.

30. The set-point monitoring system of claim 27 wherein said monitor determines a monetary cost based on a difference between said present value and a benchmark value of said associated set-point.

31. The set-point monitoring system of claim 30 wherein said monitor associates a change in power consumption with said difference between said present value and said benchmark value.

32. The set-point monitoring system of claim 31 wherein said monitor determines said monetary cost based on said change in power consumption and a predetermined power consumption cost rate.

33. The set-point monitoring system of claim 27 wherein said associated set-point is said temperature.

34. The set-point monitoring system of claim 27 wherein said associated set-point is said suction group pressure.

* * * * *